United States Patent [19]

Tokumitsu

[11] Patent Number: 5,026,137
[45] Date of Patent: Jun. 25, 1991

[54] LIGHT SIGNAL TRANSMISSION SYSTEM

[75] Inventor: Jun Tokumitsu, Sagamihara, Japan

[73] Assignee: Canon Kabushiki Kaisha, Tokyo, Japan

[21] Appl. No.: 410,909

[22] Filed: Sep. 22, 1989

[30] Foreign Application Priority Data

Sep. 26, 1988 [JP] Japan ............................. 63-238907
Sep. 26, 1988 [JP] Japan ............................. 63-238908

[51] Int. Cl.⁵ .................................................. G02B 6/28
[52] U.S. Cl. ................................. 350/96.16; 455/607; 455/612
[58] Field of Search ..................... 350/96.15, 96.16; 455/606, 607, 612

[56] References Cited

U.S. PATENT DOCUMENTS

| | | | |
|---|---|---|---|
| 4,294,509 | 10/1981 | Nagao | 350/96.15 |
| 4,317,614 | 3/1982 | Palmer | 350/96.16 |
| 4,511,208 | 4/1985 | Ozeki et al. | 350/96.16 |
| 4,662,715 | 5/1987 | Shutterly | 350/96.16 |
| 4,707,061 | 11/1987 | McMahon | 350/96.16 |
| 4,727,601 | 2/1988 | Konishi | 455/612 |
| 4,815,027 | 3/1989 | Tokumitsu et al. | 364/841 |

Primary Examiner—John D. Lee
Attorney, Agent, or Firm—Fitzpatrick, Cella, Harper & Scinto

[57] ABSTRACT

A light signal transmission system comprises first, second and third terminal stations each having a light transmitter and a light receiver, first and second light transmission paths having one end connected to the first and second terminal stations, respectively, and connectors for connecting the other ends of the first and second light transmission paths to the third terminal station, the connectors being designed that a light signal transmitted from the first terminal station through the first light transmission path is inputted to the third terminal station, a light signal emitted from the third terminal station is inputted to the second terminal station through said second light transmission path, and a light signal emitted from said second terminal station is inputted to the first terminal station through the first and second light transmission paths, without through the third terminal station.

21 Claims, 10 Drawing Sheets

FIG. I
(PRIOR ART)
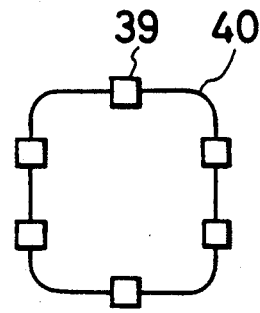
FIG.2
(PRIOR ART)
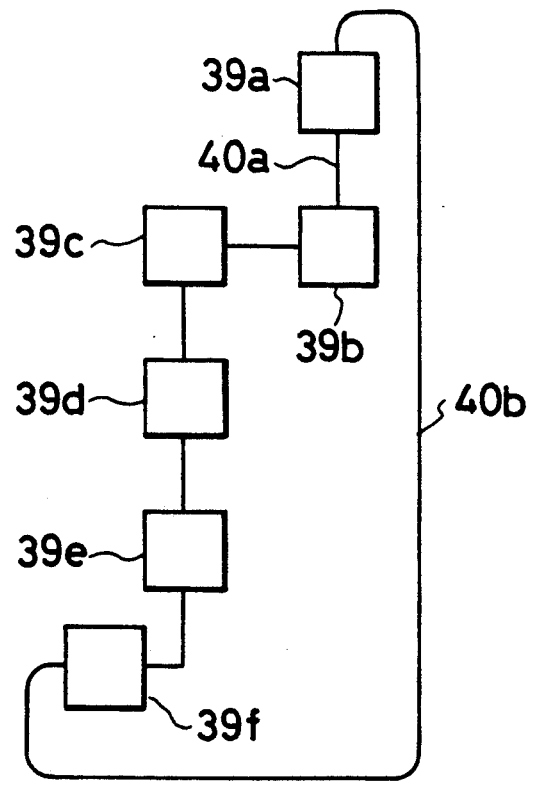

LIGHT SIGNAL TRANSMISSION SYSTEM

BACKGROUND OF THE INVENTION

1. Field of the Invention

The present invention relates to a light signal transmission system wherein signals are transmitted by means of light by interconnecting a plurality of terminal stations to each other.

2. Related Background Art

Nowadays, a light signal transmission system wherein light signals are coupled between local area networks has widely been popularized. Topology of the light signal transmission system includes a star-shaped arrangement, bus-shaped arrangement, loop-shaped arrangement or the like; among them, the loop-shaped arrangement has widely been used because of having various advantages. As shown in FIG. 1, the loop-shaped arrangement includes an annular signal transmission path obtained by interconnecting a plurality of terminals (stations) 39 through optical fibers 40. The loop-shaped arrangement has a representative advantage that a load of the transmission/reception module is small since the transmission between the terminals can be performed by transmitting the signal between only two points, thus simplifying the construction of the system.

However, in the signal transmission system of the loop-shaped arrangement, since it is necessary to form a closed loop or path by means of the transmission lines, there arises a problem that, when the terminal stations are installed, such a closed loop must previously be considered, thus reducing the freedom or flexibility for installing such terminal stations. This problem will particularly be serious or critical when the network is expanded to obtain the more complex signal transmission path in a limited space in an intelligent building or the like. For example, as shown in FIG. 2, when a plurality of stations 39a-39f are installed in order or needed and two adjacent stations are interconnected by means of an optical fiber line 40a, in order to form a closed loop, a return optical fiber line 40b for returning the signal from the last terminal station 39f to the start terminal station 39a must be prepared. Therefore, not only the need of the installation of the stations but also the signal return path must always be considered. Accordingly, while the signal transmission system of the loop-shaped arrangement was excellent in function, it arose a problem that the installation of the terminal stations thereof was limited.

SUMMARY OF THE INVENTION

An object of the present invention is to provide a light signal transmission system which can solve the above-mentioned conventional problems, and wherein loads of the transmitter and receiver in each terminal station are small, and the terminal stations and the light transmission path can easily be installed.

The above object is achieved by providing a light signal transmission system comprising first, second and third terminal stations each having a light transmitter and a light receiver, first and second light transmission paths each having one end connected to the first and second terminal stations, respectively, and connectors for connecting the other ends of the first and second light transmission paths to the third terminal station, the connectors being designed so that a light signal transmitted from the first terminal station through the first light transmission path is inputted to the third terminal station, a light signal emitted from the third terminal station is inputted to the second terminal station through the second light transmission path, and a light signal emitted from the second terminal station is inputted to the first terminal station through the first and second light transmission paths, without passing through the third terminal station.

BRIEF DESCRIPTION OF THE DRAWINGS

FIGS. 1 and 2 show examples of conventional light signal transmission systems of loop-shaped arrangement;

DETAILED DESCRIPTION OF THE PREFERRED EMBODIMENTS

Figure 3:
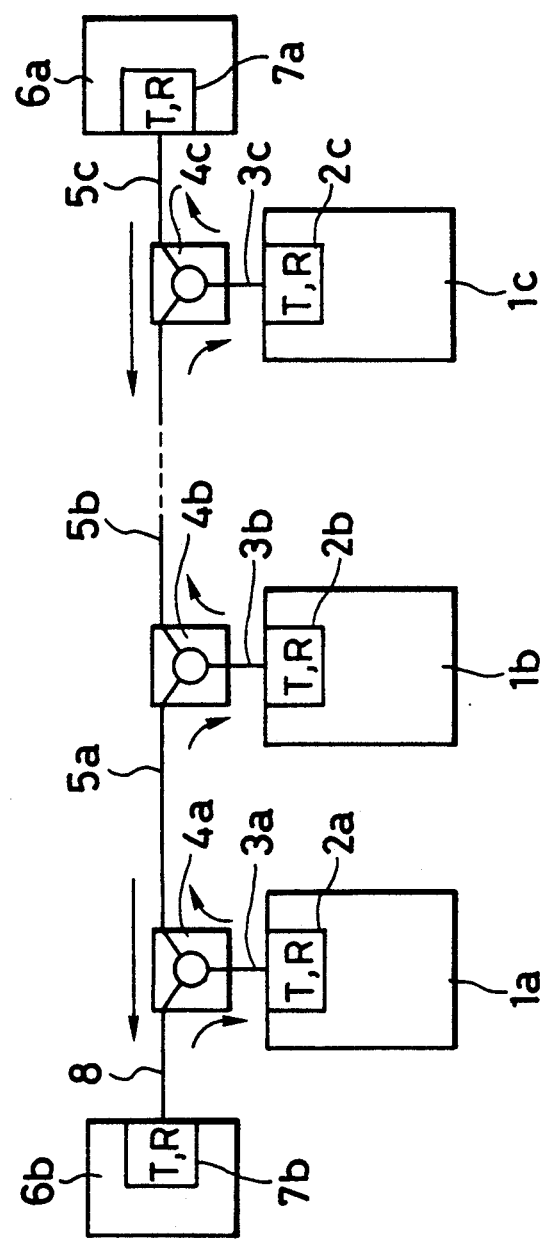
FIG. 3 is a schematic constructural view of a light signal transmission system according to a first embodiment of the present invention.

FIG. 3 shows a schematic constructural view of a light signal transmission system according to a first embodiment of the present invention. In FIG. 3, the reference numerals 1a, 1b, 1c designate terminal stations, and the reference numerals 2a, 2b, 2c designate transmission/reception portions arranged in the respective terminal stations 1a, 1b, 1c. Optical fiber lines 3a, 3b, 3c are connected to the corresponding transmission/reception portions 2a, 2b, 2c. Circulators 4a, 4b, 4c are connected to the respective transmission/reception portions 2a, 2b, 2c through the respective optical fiber lines 3a, 3b, 3c and may be of the type as described in the Japanese magazine "Shingaku Giho OQE83-2" (page 9, 1983).

Figure 4:
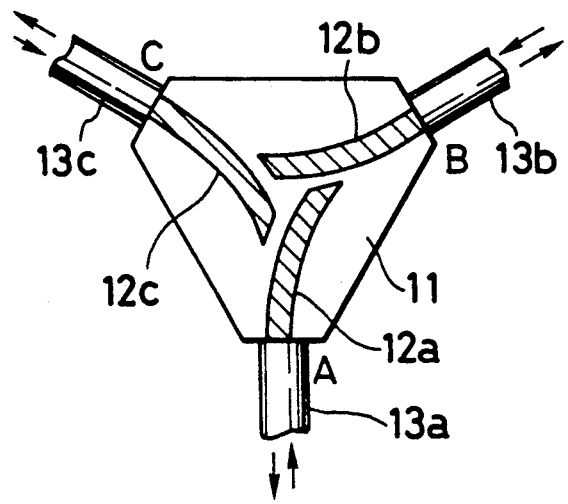
FIG. 4 is a sectional view showing a concrete construction of a circulator of the system of FIG. 3.

FIG. 4 is a plan view of the circulator. The circulator comprises a substrate 11 which may be made of glass plate, and light waveguide paths 12a, 12b, 12c each of which may be formed by ion exchange method, diffusion of high refractive material, or by forming as a ridged configuration. Optical fiber lines 13a, 13b, 13c are connected to the terminals of the circulator, through which the signals are inputted and outputted. The terminals to which the optical fiber lines 13a, 13b, 13c are connected will be called as a port A, port B, and port C, respectively. If the light signal is transmitted through the optical fiber line 13a, the light signal is further transmitted from the optical fiber line 13a to the light wave guide path 12a. Further, the light signal is transmitted from the light waveguide path 12a to the light waveguide path 12b to be directed to the optical fiber line 13b. Similarly, the light signal inputted from the optical fiber line 13b passes through the light waveguide path 12b and then is transmitted to the light waveguide path 12c and then is emitted from the optical fiber line 13c. Similarly, the light signal inputted from the optical fiber line 13c passes through the light waveguide path 12a and then is emitted from the optical fiber line 13a. That is to say, the signal inputted from the port A is outputted to the port B, the signal inputted from the port B is outputted to the port C, and the signal inputted from the port C is outputted to the port A. In this way, in the circulator, the input and output ports are in turn circulated between the adjacent two ports. The circulator may be made of magnetic optical material.

In FIG. 3, optical fiber lines 5a, 5b, 5c are connected to the circulators 4a, 4b, 4c, respectively. Repeat stations 6a and 6b are provided, which include transmission/reception portions 7a and 7b, respectively. An optical fiber line 8 connects the transmission/reception portion 7b of the repeat station 6b to the circulator 4a. Each repeat station functions to receive the light signal transmitted through the optical fiber line and transmit the signal in an opposite direction, and further can serve to emit the light signal by itself or pick up the light signal transmitted thereto, like the other terminal stations.

As shown in FIG. 3, as to the connection of the optical fiber lines, the optical fiber lines 3a, 3b, 3c connect the transmission/reception portions 2a, 2b, 2c of the terminal stations 1a, 1b, 1c to the circulators 4a, 4b, 4c, respectively; the optical fiber lines 5a, 5b connect two circulators of the adjacent terminal stations; the optical fiber line 5c connects the circulator 4c of the terminal station 1c to the transmission/reception portion 7a of the repeat station 6a; and the optical fiber line 8 connects the circulator 4a of the terminal station 1a to the transmission/reception portion 7b of the repeat station 6b. It is assumed that the signal is sent from the transmission/reception portion 2a of the terminal station 1a to the optical fiber line 3a. The transmission/reception portions 2a, 2b, 2c of the terminal stations 1a, 1b, 1c and the transmission/reception portions 7a, 7b of the repeat stations 6a, 6b have the same construction.

Figure 5:
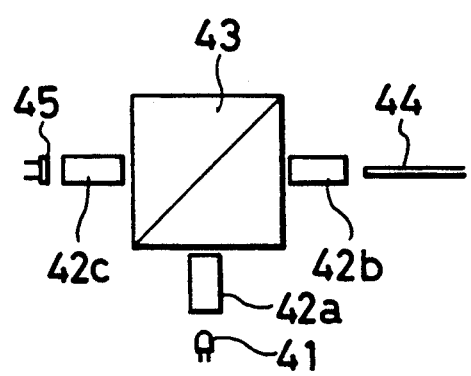
FIG. 5 is a schematic view showing a concrete construction of a transmission/reception portion of the system of FIG. 3.

FIG. 5 shows an example of a concrete construction of the transmission/reception portion of each terminal station or each repeat station. The reference numeral 41 designates a light source or luminous element which may comprise a semi-conductor laser, luminous diode (LED) and the like. The reference numerals 42a, 42b, 42c designate convergent lenses; 43 designates a beam splitter; 44 designates an optical fiber line; and 45 designates a light receiving element which may comprise a p-i-n photodiode, Avalanche photodiode and the like.

Since the transmission/reception portion has a construction as shown in FIG. 5, it can transmit the signal to the optical fiber line and receive the signal from the optical fiber line. More particularly, the luminous element 41 emits the light beams in response to a drive signal, and the bundle of the emitted light beams is collimated by means of the lens 42a. The collimated bundle of light is partly reflected by the beam splitter 43. The reflected light is collected by the lens 42b and is guided to the optical fiber line 44. On the other hand, regarding the reception of the signal sent from the optical fiber line 44, the bundle of light emitted from the optical fiber line 44 is collimated by the lens 42b. The collimated light is partly passed through the beam splitter 43 to reach the lens 42c, where the light is collected, and the collected light is detected by the light receiving element 45.

In FIG. 3, the light signal sent from the transmission/reception portion 2a to the optical fiber line 3a is introduced to the circulator 4a. In accordance with the above-mentioned operation of the circulator, the light signal from the optical fiber line 3a is sent to the optical fiber line 5a by means of the circulator 4a. The light signal transmitted through the optical fiber line 5a is introduced into the circulator 4b, and then is sent to the optical fiber line 3b. The light signal transmitted through the optical fiber line 3b is received by the transmission/reception portion 2b. In this way, the signal is sent from the terminal station 1a to the terminal station 1b. In the terminal station 1b, the received signal is again sent to other stations as it is, in accordance with the contents of the signal or the transmission demand from the terminal station 1b itself, or is appropriately modified to be sent to other station. The transmission/reception portion 2b of the terminal station 1b sends the signal to the optical fiber line 3b. This signal passes through the circulator 4b and then is sent to the optical fiber line 5b. In this way, the signal is successively transmitted between the terminal stations in a right direction of FIG. 3. In the rightmost terminal station 1c, the signal sent from the adjacent terminal station (1b) is transmitted to the optical fiber line 3c through the circulator 4c and then is received by the transmission/reception portion 2c. Then, the terminal station 1c transmits the signal from the transmission/reception portion 2c to the optical fiber line 3c. This signal is directed to the optical fiber line 5c by means of the circulator 4c, and then is received by the transmission/reception portion 7a of the repeat station 6a. The repeat station 6a sends the received signal as it is to the optical fiber line 5c through the transmission/reception portion 7a, or the received signal is modified to change the wave shape thereof or is amplified and then is sent to the optical fiber line 5c through the transmission/reception portion 7a. On the other hand, the light signal incident to the circulator 4c from the optical fiber line 5c is not directed to the terminal station 1c, but is directed to the optical fiber line connecting between the terminal stations, by the function of the circulator 4c. Further, this signal goes to the optical fiber line 4b and is directed to the optical fiber line 5a by the function of the circulator 4b, and then is directed to the optical fiber line 8 by the function of the circulator 4a, and lastly is received by the transmission/reception portion of the repeat station 6a. In this way, the signal transmission to the repeat station 6b is performed without passing through the terminal stations 1a, 1b and 1c. The repeat station 6b sends the received signal as it is to the optical fiber line 8 through the transmission/reception portion 7b, or the received signal is modified to change the wave shape thereof or is amplified and then is sent to the optical fiber line 8 through the transmission/reception portion 7b. The light signal transmitted to the optical fiber line 8 is sent to the optical fiber line 3a through the circulator 4a and then is received by the transmission/reception portion 2a of the terminal station 1a. In this way, the signal is circulated, whereby the signal is transmitted along the looped path.

Figure 6:
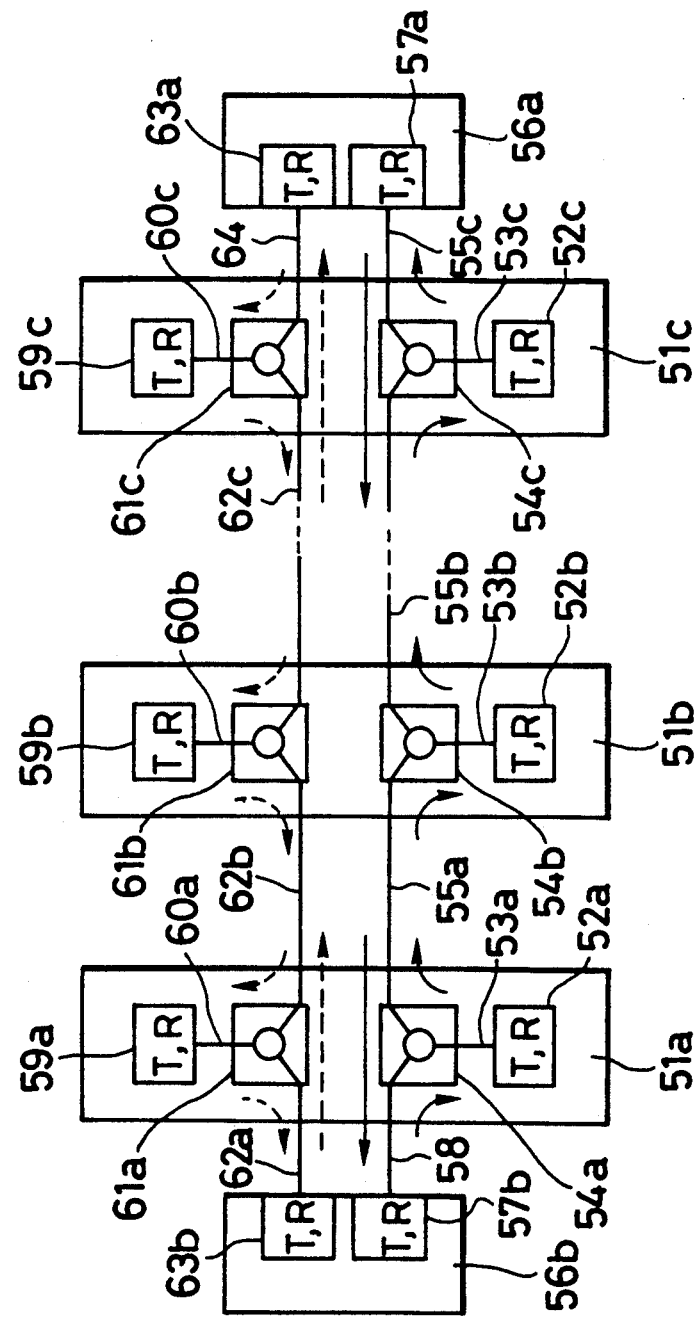
FIG. 6 is a schematic constructural view of a light signal transmission system according to a second embodiment of the present invention.

FIG. 6 is a schematic constructional view showing a second embodiment of the present invention. In FIG. 6, the reference numerals 51a, 51b, 51c designate terminal stations including first transmission/reception portions 52a, 52b, 52c, respectively. Optical fiber lines 53a, 53b, 53c are connected to the transmission/reception portions 52a, 52b, 52c, respectively. The reference numerals 54a, 54b, 54c designate first circulators connected to optical fiber lines 55a, 55b, 55c, respectively. The reference numerals 56a, 56b designate repeat stations including first transmission/reception portion 57a, 57b, respectively. Optical fiber line 58 connects the transmission/reception portion 57b of the repeat station 56b to the circulator 54a.

The terminal stations 51a, 51b, 51c includes second transmission/reception portions 59a, 59b, 59c, respectively. Optical fiber lines 60a, 60b, 60c are connected to the second transmission/reception portions 59a, 59b, 59c of the terminal stations 51a, 51b, 51c, respectively. The reference numerals 61a, 61b, 61c designate second circulators connected to optical fiber lines 62a, 62b, 62c, respectively. The repeat stations 56a and 56b include second transmission/reception portions 63a, and 63b, respectively. An optical fiber line 64 connects the repeat station 56a to the circulator 61c.

In the second embodiment of the present invention, two looped paths are provided. Each of two looped paths is similar to the looped path of the first embodiment. Thus, the connection of the optical fiber lines is the same as that of the first embodiment, as apparent from the observation of the respective loops shown by the solid arrow and the broken arrow. The first transmission/reception portions 52a, 52b, 52c and the second transmission/reception portions 59a, 59b, 59c of the terminal stations 51a, 51b, 51c, and the first transmission/reception portions 57a, 57b and the second transmission/reception portions 63a, 63b of the repeat stations 56a, 56b are the same as the transmission/reception portions 2a, 2b, 2c or the transmission reception portions 7a, 7b in the first embodiment.

Further, the first circulators 54a, 54b, 54c and the second circulators 61a, 61b, 61c are the same as the circulators 4a, 4b, 4c in the first embodiment. In consideration of the loop shown by the solid arrow in the second embodiment, the constructions of the first transmission/reception portions 52a, 52b, 52c of the terminal stations 51a, 51b, 51c, the optical fiber lines 53a, 53b, 53c, the first circulators 54a, 54b, 54c, the optical fiber lines 55a, 55b, 55c, 58, and the first transmission/reception portions 57a, 57b of the repeat stations 55a, 55b are the same as those in the loop in the first embodiment, and thus, it is apparent that the signal is transmitted along the looped path. On the other hand, in the loop shown by the broken arrows in the second embodiment, the direction of the signal transmission between the repeat stations is directed from the repeat station 56b to the repeat station 56a, which is opposed to the direction of the signal transmission between the repeat stations in the loop shown by the solid arrows. However, also in this case, a looped path is formed. That is to say, the loop is formed by the second transmission/reception 59a, 59b, 59c of the terminal stations 51a, 51b, 51c, the optical fiber lines 60a, 60b, 60c, the circulators 61a, 61b, 61c, the optical fiber lines 62a, 62b, 62c, 64 and the second transmission/reception portions 63a, 63b of the repeat stations 56a, 56b.

In the second embodiment, since there are two loops, even if one of the optical fiber lines, for example, the optical fiber line 55a is broken or damaged so that the signal cannot be transmitted along the loop shown by the solid arrows, the signal can be transmitted along the other looped path shown by the broken arrows, thereby making the system more durable against the accident or mishap. Further, if two optical fiber lines connecting two stations, for example, the optical fiber lines 55a and 62b are both broken, a new one looped path can be formed by utilizing the two damaged loops. In this case, the signal is transmitted in the following order.

The terminal station 51b sends the signal to the right-hand adjacent terminal station by utilizing the loop shown by the solid arrows. This signal is successively sent to the right-hand adjacent terminal stations to reach the terminal station 51c. The signal is then sent from the transmission/reception portion 52c of the terminal station 51c to the first transmission/reception portion 57a of the repeat station 56a. Subsequently, the repeat station 56a sends the received signal as it is (or modified to change the wave shape thereof or amplified) from the second transmission/reception portion 63a to the optical fiber line 64. Then, the signal is sent from the terminal station 51c to the left-hand terminal stations in order along the looped path shown by the broken arrows, to at last reach the second transmission/reception portion 59b of the terminal station 51b. Then, the terminal station 51b sends the received signal from the first transmission/reception portion 52b to the right-hand adjacent terminal station along the looped path shown by the solid arrows, thus completing the closed loop.

In the above-mentioned embodiments, while the circulators were used as connectors, in place of the circulators, beam splitters may be used to form the light signal transmission system according to the present invention. An example thereof will be explained below.

Figure 7:
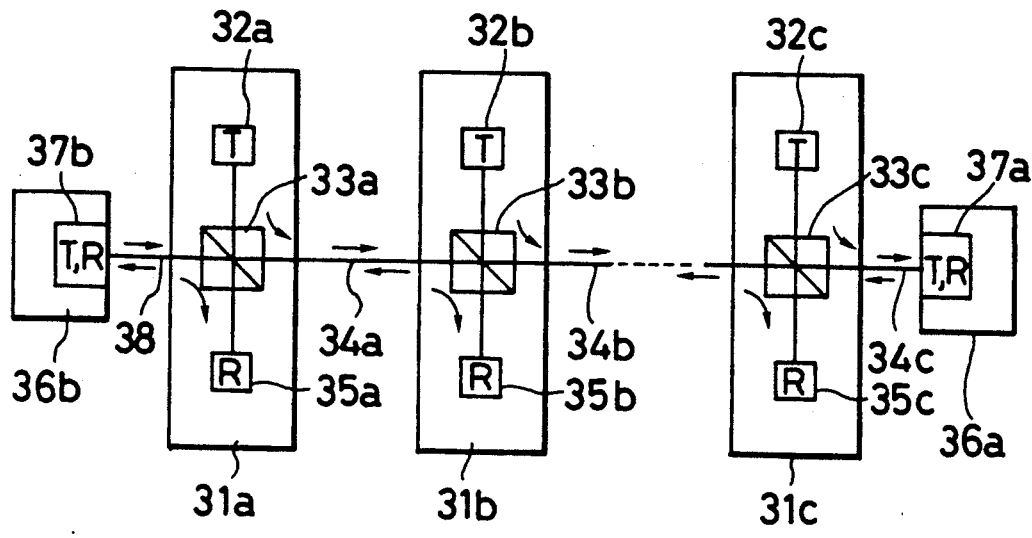
FIG. 7 is a schematic constructural view of a light signal transmission system according to a third embodiment of the present invention.

FIG. 7 is a schematic constructional view showing a light signal transmission system according to a third embodiment of the present invention. In FIG. 7, the reference numerals 31a, 31b, 31c designate terminal stations including transmission portions 32a, 32b, 32c, respectively. The reference numerals 33a, 33b, 33c designate spectral beam splitters connected to optical fiber lines 34a, 34b, 34c, respectively. The terminal stations 31a, 31b, 31c further include reception portions 35a, 35b, 35c, respectively. The reference numerals 36a, 36b designate repeat stations including transmission/reception portions 37a, 37b, respectively. An optical fiber line 38 connects the repeat station 36b to the terminal station 31.

Next, the transmission of the light signal will be explained.

When the light signal is emitted from the transmission portion 32a of the terminal station 31a, the light signal is reflected by the spectral beam splitter 33a to be directed to the optical fiber line 34a.

Figure 8:
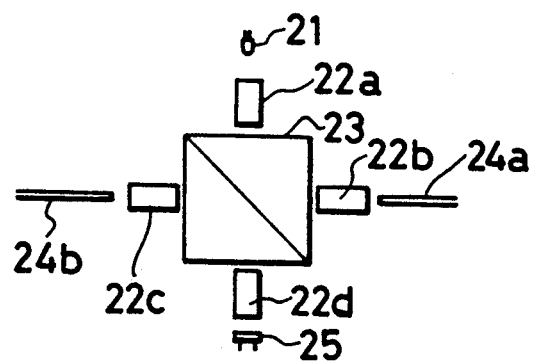
FIG. 8 is a schematic view showing a concrete construction of a transmission/reception portion in each terminal station of the system of FIG. 7.

FIG. 8 shows a concrete construction of the transmission portion and the reception portion in each terminal station.

The reference numeral 21 designates a luminous element which may comprise an LED, semi-conductor laser or the like; 22a–22d designate convergent lenses; 23 designates a spectral beam splitter; 24a, 24b designate optical fiber lines connected to the terminal station or to the repeat station; and 25 designates a light receiving element which may comprise a p-i-n photodiode, Avalanche photodiode and the like. A bundle of light emitted from the luminous element 21 is substantially collimated by the convergent lens 22a and then is introduced into the spectral beam splitter 23. The beam splitter 23 can reflect or pass through the received bundle of light in accordance with the wavelength of the light.

Figure 9:
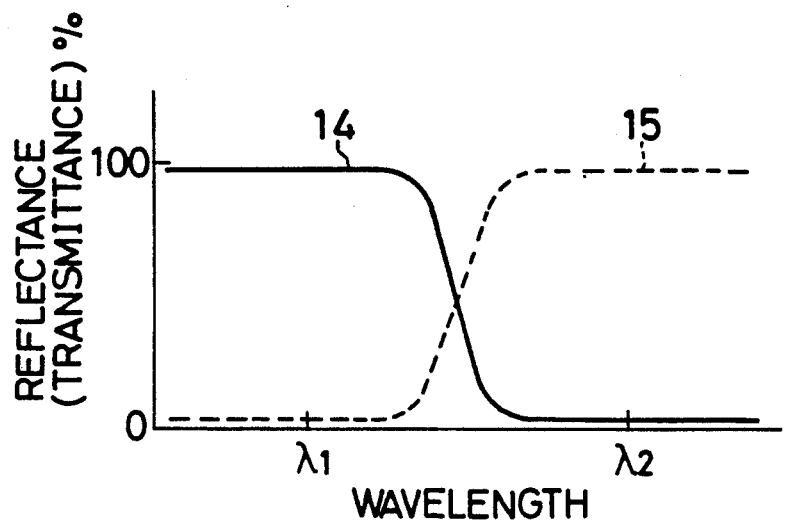
FIG. 9 is a graph showing a spectral characteristic of a spectral beam splitter of the system of FIG. 7.

FIG. 9 is a graph showing a spectral characteristic of the above-mentioned beam splitter. In FIG. 9, a curve 14 represents spectral reflectance and a curve 15 represents spectral transmittance. As apparent from FIG. 9, if a wavelength of the bundle of light incident to the beam splitter is selected to have a value of $\lambda_1$, almost all of the light is reflected; whereas, if the wavelength is selected to have a value of $\lambda_2$, almost all of the light is passed through or transmitted. The features of the reflectance 14 and the transmittance 15 can be varied by changing the material of which a dielectric multi-layer film of the beam splitter 23 is made, the thickness of the film and/or the construction of the films.

In FIG. 8, when the wavelength of the light from the luminous element 21 is selected to have the value of $\lambda_1$, the bundle of light emitted from the luminous element 21 and introduced into the beam splitter 23 through the convergent lens 22a is reflected by the beam splitter to be directed toward the convergent lens 22b. The reflected light is collected by the convergent lens 22b and then is sent to the optical fiber line 24a and is transmitted therefrom. On the other hand, when the light sent from the optical fiber line 24b has a wavelength $\lambda_1$, the bundle of light emitted from the optical fiber line 24b is substantially collimated by the convergent lens 22c, and then is reflected by the beam splitter 23 to be directed toward the convergent lens 22d. Subsequently, the bundle of light is collected by the convergent lens 22d to reach the light receiving element 25.

On the other hand, if the light sent from the optical fiber line 24a has a wavelength $\lambda_2$, the bundle of light emitted from the optical fiber line 24a is collimated by the convergent lens 22b, and then passes through the beam splitter 23 to be introduced the convergent lens 22c. Subsequently, the bundle of light is collected by the convergent lens 22c to be sent to the optical fiber line 24d and then is transmitted therefrom.

In FIG. 7, the light signal having a wavelength $\lambda_1$ is emitted from the transmission portion 32a of the terminal station 31a. This light signal is reflected by the beam splitter 33a to be directed toward the optical fiber line 34a. Subsequently, the light signal is introduced into the beam splitter 33b, where the light signal is reflected to reach the reception portion 35b of the terminal station 31b. In this way, the signal transmission from the terminal station 31a to the terminal station 31b is performed. The terminal station 31b sends the received signal as it is (or modified to change the wave shape thereof or amplified) from the transmission portion 32b. This light signal has the wavelength $\lambda_1$, and, accordingly, is reflected by the beam splitter 33b to be directed to the optical fiber line 34b. Similarly, the signal is sent to the right-hand adjacent terminal stations in order. In the terminal station 31c, the bundle of light sent from the adjacent terminal station is introduced into the beam splitter 33c, where the light is reflected to be received by the reception portion 35c. The terminal station 31c emits the light signal having the wavelength $\lambda_1$ from its transmission portion 32c on the basis of the received signal. This light signal is reflected by the beam splitter 33c to reach the optical fiber line 34c, and then is received by the transmission/reception portion 37a of the repeat station 36a.

Figure 10:
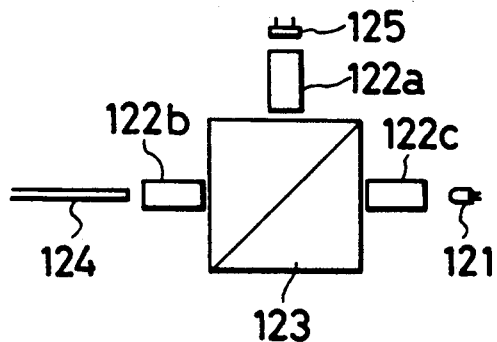
FIGS. 10 and 11 are schematic views showing a concrete construction of a transmission/reception portions in repeat stations of the system of FIG. 7.

FIG. 10 is a schematic view showing a concrete construction of the transmission/reception portion 37a of the repeat station 36a. The reference numeral 121 designates a luminous element which may comprise semiconductor laser, LED and the like. The reference numerals 122a, 122b, 122c designate convergent lenses, and 123 designates a spectral beam splitter which may have the same feature as that shown in FIG. 9. The reference numeral 124 designates an optical fiber line, and 125 designates a light receiving element which may comprise a p-i-n photodiode, Avalanche photodiode and the like.

In the transmission/reception portion 37a, the input and output of the signal on the same optical fiber line can be effected. The luminous element 121 can emit the light having the wavelength $\lambda_2$. The bundle of light emitted from the luminous element is substantially collimated by the convergent lens 122c, and then passes through the beam splitter 123 to reach the convergent lens 122b, where the bundle of light is collected to be introduced into the optical fiber line 124, and then is transmitted therefrom. On the other hand, the light having the wavelength $\lambda_1$ and sent from the optical fiber line 124 is collimated by the convergent lens 122b and then is reflected by the beam splitter 123. The reflected light is collected by the convergent lens 122a to reach the light receiving element 125.

Referring to FIG. 8, in the transmission/reception portion 37a of the repeat station 36a, since the bundle of light sent from the optical fiber line 34c has the wavelength $\lambda_1$, the reception of the signal is effected. The repeat station 36a sends the received signal as it is (or modified to change the wave shape thereof or amplified) as the light having the wavelength $\lambda_2$ from its transmission/reception portion 37a to the optical fiber line 34c. Since the beam splitters 33a, 33b, 33c can pass through the light having the wavelength $\lambda_2$, the light from the transmission/reception portion 37a passes through the optical fiber lines 34c, 34b, 34a and the beam splitters 33c, 33b, 33a as it is, to reach the optical fiber line 38, and then is received by the transmission/reception portion 37b of the repeat station 36b.

Figure 11:
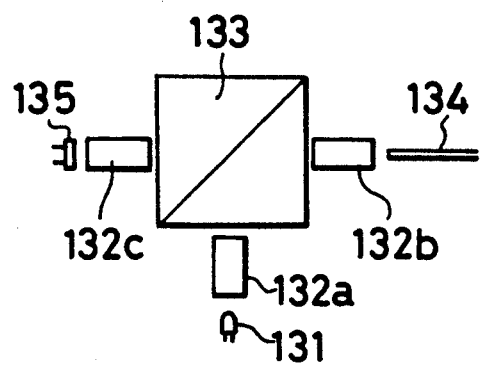

FIG. 11 is a schematic view showing a concrete construction of the transmission/reception portion 37b of the repeat station 36b. The transmission/reception portion 37b has the same construction as that of the transmission/reception portion 37a shown in FIG. 10. The reference numeral 131 designates a luminous element; 132a, 132b, 132c designate convergent lenses; and 133 designates a spectral beam splitter having a feature as shown in FIG. 9. The reference numeral 134 designates an optical fiber line, and 135 designates a light receiving element.

The light emitted from the luminous element 131 has a wavelength $\lambda_1$. The bundle of light emitted from the luminous element 131 is colimated by the convergent lens 132a and then is reflected by the beam splitter 133. The reflected light is introduced into the convergent lens 132b, where the bundle of light is collected to be sent to the optical fiber line 134, and then is transmitted therefrom.

On the other hand, when the light having the wavelength $\lambda_2$ is sent from the optical fiber line 134, the light is collimated by the convergent lens 132b, and then passes through the beam splitter 133 to be directed toward the convergent lens 132c, where the bundle of light is collected, and then is received by the light receiving element 135. The wavelength $\lambda_1$, $\lambda_2$ of the light to be used can be selected in various ways. For example, the wavelength $\lambda_1$ may be included in a band of the order of 0.8 μm and the wavelength $\lambda_2$ may be included in a band of the order of 1.3 μm. In this case, a semi-conductor laser or LED of GaAlAs group is suited as the luminous element for emitting the light having the wavelength $\lambda_1$. A semi-conductor laser or LED of InGaAsP group can be used as the luminous element for emitting the light having the wavelength $\lambda_2$. Further, a p-i-n photodiode using Si or Si Avalanche photodiode can be utilized as the light receiving element for receiving the light having the wavelength $\lambda_1$. An avalanche photodiode or photodiode of InGaAs group or Ge group may be utilized as the light receiving element for receiving the light having the wavelength $\lambda_2$.

Further, both of the wavelengths $\lambda_1$, $\lambda_2$ may be selected in a band of the order of 0.8 μm or may be selected in a band of the order of 1.3 μm. In addition, the wavelengths $\lambda_1$, $\lambda_2$ can be selected in a band of the order of 1.5 μm.

In FIG. 7, since light sent from the optical fiber line 38 to the transmission/reception portion 37b of the repeat station 36b has the wavelength $\lambda_2$, as previously explained in connection with FIG. 11, this light (signal) can be received by the transmission/reception portion 37b. The repeat station 36b sends the received signal as it is (or modified to change the wave shape thereof or amplified) from its transmission/reception portion 37b to the optical fiber line 38 as light having the wavelength $\lambda_1$. The light signal is reflected by the beam splitter 33a and then is received by the reception portion 35a of the terminal station 31a. In this way, the signal is circulated, thus performing the signal transmission along the closed loop. As apparent from the foregoing explanation, in FIG. 7, the light transmitted through the optical fiber lines in a rightward direction has the wavelength $\lambda_1$, and the light transmitted through the optical fiber lines in a leftward direction has the wavelength $\lambda_2$.

Figure 12:
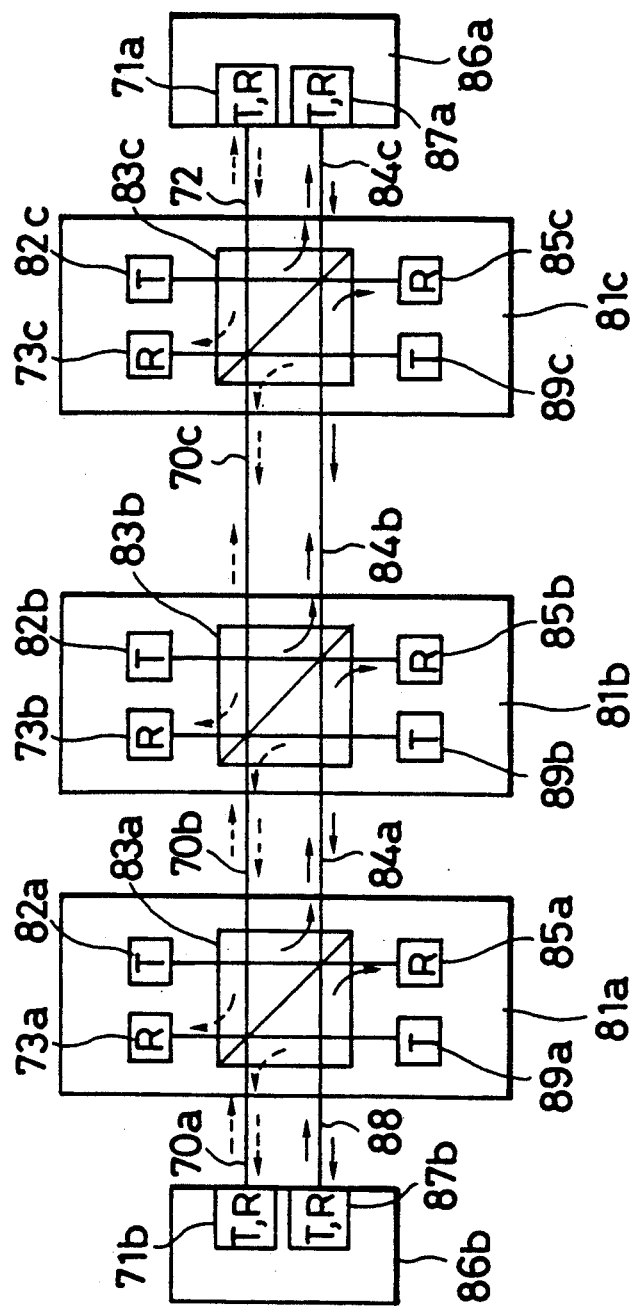
FIG. 12 is a schematic constructural view of a light signal transmission system according to a fourth embodiment of the present invention.

FIG. 12 is a schematic view showing a fourth embodiment of the present invention. In FIG. 12, the reference numerals 81a, 81b, 81c designate terminal stations including first transmission portions 82a, 82b, 82c, respectively. The reference numerals 83a, 83b, 83c designate spectral beam splitters connected to optical fiber lines 84a, 84b, 84c, respectively. The terminal stations 81a, 81b, 81c further include first reception portions 85a, 85b, 85c, respectively. The reference numerals 86a, 86b designate repeat stations including first transmission portions 87a, 87b, respectively. An optical fiber line 88 connects the repeat station 86b to the terminal station 81a.

The terminal stations 81a, 81b, 81c further include second transmission portions 89a, 89b, 89c, respectively. The reference numerals 70a, 70b, 70c designate optical fiber lines connected to the beam splitters 83a, 83b, 83c, respectively. The repeat stations 86a, 86b further include second transmission/reception portions 71a, 71b, respectively. An optical fiber line 72 connects the terminal station 81c to the repeat station 86a. The terminal stations 81a, 81b, 81c further include second reception portions 73a, 73b, 73c, respectively. In FIG. 12, the structure constituted by the first and second transmission portions, first and second reception portions and beam splitters is the same as that shown in FIG. 8.

More particularly, the light signal transmission system shown in FIG. 12 is constituted by luminous element, light receiving element, convergent lenses, spectral beam splitters, optical fiber lines and the like and is designed to use the reflection surfaces of the beam splitters independently at two points. The features of the beam splitters 83a, 83b, 83c are the same as shown in FIG. 9. Further, the construction of the first transmission/reception portion of the repeat station 86a and of the second transmission/reception portion 71b of the repeat station 86b is the same as that shown in FIG. 10. That is to say, these portions can receive the light signal having the wavelength $\lambda_1$ and sent from the optical fiber line, and transmit the light signal having the wavelength $\lambda_2$ to the optical fiber line.

On the other hand, the construction of the second transmission/reception portion 71a of the repeat station 86a and of the first transmission/reception portion 87b of the repeat station 86b are the same as that shown in FIG. 11. These portions can receive the light signal having the wavelength $\lambda_2$ and sent from the optical fiber line, and transmit the light signal having the wavelength $\lambda_1$ to the optical fiber line.

In the fourth embodiment, two loops, that is to say, a first loop shown by the solid arrows and a second loop shown by the broken arrows are formed. The loop shown by the solid arrows is the same as the loop shown in the first embodiment. This loop is constituted by the first transmission portions 82a, 82b, 82c and first reception portions 85a, 85b, 85c of the terminal stations 81a, 81b, 81c, spectral beam splitters 83a, 83b, 83c, optical fiber lines 84a, 84b, 84c, 88, and first transmission/reception portions 87a, 87b of the repeat stations 86a, 86b. The light signal having the wavelength $\lambda_1$ is successively transmitted in the rightward direction, and the repeat station 86b sends the light signal having the wavelength $\lambda_2$ to the leftmost repeat station 86b. The second loop shown by the broken arrow, is similar to the first loop; however, in the second loop, the light having the wavelength $\lambda_1$ is successively transmitted between the terminal stations in the leftward direction, and the light having the wavelength $\lambda_2$ is successively returned in the rightward direction. As apparent from FIG. 12, the second loop is formed by the second transmission portions 89a, 89b, 89c and second reception portions 73a, 73b, 73c of the terminal stations 81a, 81b, 81c, spectral beam splitters 83a, 83b, 83c, optical fiber lines 70a, 70b, 70c, 72 and second transmission/reception portions 71a, 71b of the repeat stations 86a, 86b.

In the fourth embodiment, since there are two loops, even if one of the optical fiber lines, for example, the optical fiber line 84a is broken so that the signal cannot be transmitted along the loop shown by the solid arrows, the signal can be transmitted along the other loop shown by the broken arrows, thereby making the system more durable against the accident. Further, if two optical fiber lines connecting two stations, for example, the optical fiber lines 84a, 70b are broken, a new one looped path can be formed by utilizing the two damaged loops. In this case, the signal is transmitted in the following order.

The terminal station 81b sends the signal to the right-hand adjacent terminal station by utilizing the loop shown by the solid arrows. This signal is successively sen to the right-hand adjacent terminal stations to reach the terminal station 81c. The signal is then sent from the transmission portion 82c of the terminal station 81c to the first transmission/reception portion 87a of the repeat station 86a. Subsequently, the repeat station 86a sends the received signal as it is (or modified to change the wave shape thereof or amplified) from its second transmission/reception portion 71a to the optical fiber line 72. Then, the signal is sent from the terminal station 81c to the left-hand terminal stations in order along the looped path shown by the broken arrows, to at last reach the second reception portion 73b of the terminal station 81b. Then, the terminal station 81b sends the received signal from its first transmission portion 82b to the right-hand adjacent terminal station along the looped path shown by the solid arrows, thus completing the closed loop.

Figure 13:
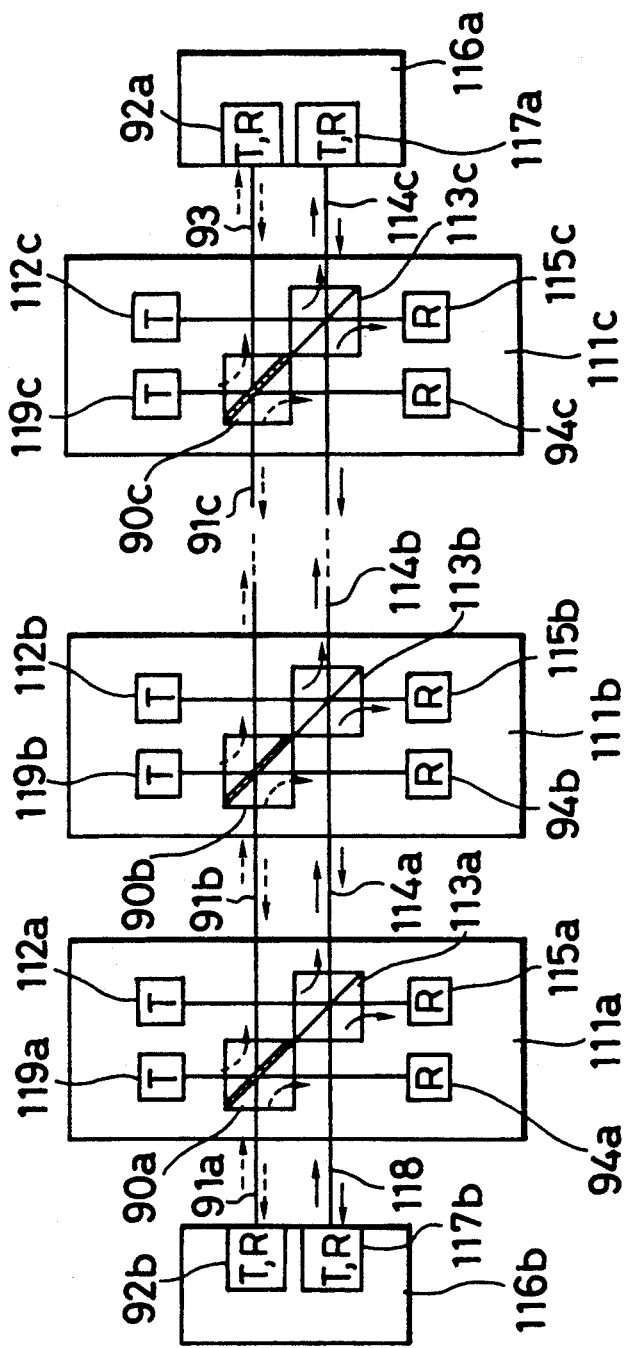
FIG. 13 is a schematic constructional view of a light signal transmission system according to a fifth embodiment of the present invention.

FIG. 13 is a schematic constructional view showing a light signal transmission system according to a fifth embodiment of the present invention. In FIG. 13, the reference numerals 111a, 111b, 111c designate terminal stations including first transmission portions 112a, 112b, 112c, respectively. The reference numeral 113a, 113b, 113c designate first spectral beam splitters each having the feature same as that shown in FIG. 9. The reference numerals 114a, 114b, 114c designate optical fiber lines connected to the beam splitters 113a, 113b, 113c, respectively. The terminal stations 111a, 111b, 111c further include first reception portions 115a, 115b, 115c, respectively. The reference numerals 116a, 116b designate repeat stations including first transmission/reception portions 117a, 117b, respectively. An optical fiber line 118 connects the terminal station 111a to the repeat station 116b. The terminal stations 111a, 111b, 111c further include second transmission/reception portions 119a, 119b, 119c, respectively. The reference numerals 90a, 90b, 90c designate second spectral beam splitters.

Figure 14:
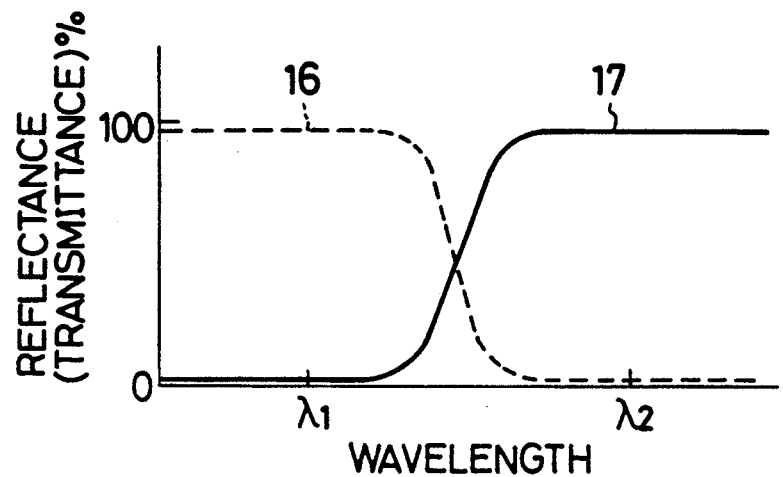
FIG. 14 is a graph showing a spectral characteristic of a spectral beam splitter of the system of FIG. 13.

FIG. 14 is a graph showing a spectral characteristic of each of the second beam splitters 90a, 90b, 90c.

In FIG. 14, a curve 17 represents the spectral reflectance, and a curve 16 represents the spectral transmittance. As apparent from the comparison between FIG. 9 and FIG. 14, the characteristic of each first beam splitter 113a, 113b, 113c is complementary to the characteristic of each second beam splitters 90a, 90b, 90c with respect to the wavelengths $\lambda_1$, $\lambda_2$ to be used. That is to say, the second beam splitters 90a, 90b, 90c can pass through the incident light having the wavelength $\lambda_1$, and reflect the incident light having the wavelength $\lambda_2$. In FIG. 13, the reference numerals 91a, 91b, 91c designate optical fiber lines connected to the second beam splitters 90a, 90b, 90c, respectively. The repeat stations 116a, 116b further include second transmission/reception portions 92a, 92b, respectively. An optical fiber line 93 connects the repeat station 116a to the terminal station 111c. More particularly, the first and second transmission portions and reception portions of the terminal stations, and the first and second beam splitters are constructed as follows.

Figure 15:
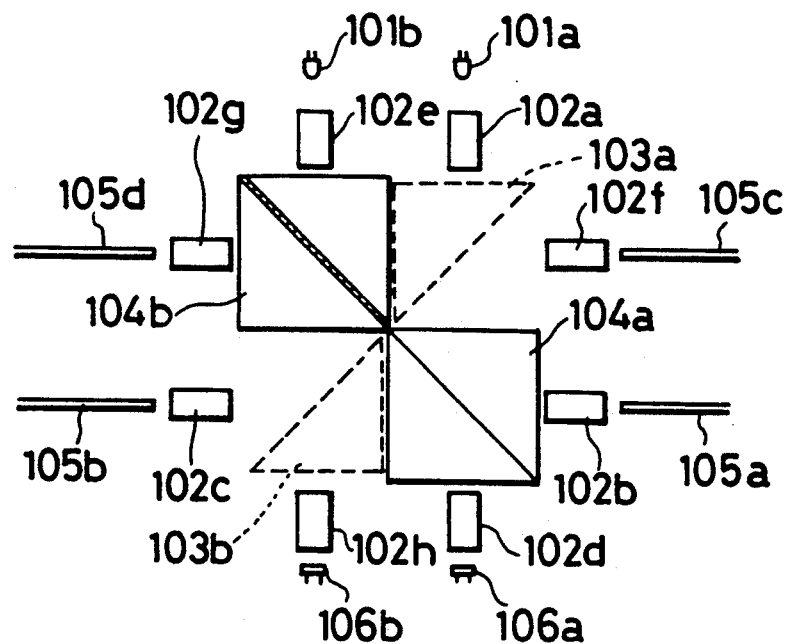
FIGS. 15 and 16 are schematic views showing a concrete construction of a transmission/reception portion in each terminal station of the system of FIG. 13.

FIG. 15 is a schematic view showing an example of concrete constructions of the first and second transmission portion and reception portion of each terminal station, and of the first and second beam splitters.

In FIG. 15, the reference numerals 101a, 101b designate first and second luminous elements, and 102a–102h designate convergent lenses. The reference numerals 103a, 103b designate first and second prisms movable in a direction perpendicular to a plane of FIG. 15. In FIG. 15, the prisms are shown in the condition that they are not positioned in the respective light paths. The reference numerals 104a, 104b designate first and second spectral beam splitters having features shown in FIG. 9 and FIG. 14, respectively. The reference numerals 105a, 105b designate optical fiber lines. Members or elements shown in FIG. 15 are approximately the same as those shown in the third and fourth embodiments, except for the first and second prisms 103a, 103b and the like. Incidentally, the first luminous element 101a can emit the light having the the wavelength $\lambda_1$, the second luminous element 101b can emit the light having the wavelength $\lambda_2$. the first light receiving element 106a can receive the light having the wavelength $\lambda_1$, and the second light receiving element 106b can receive the light having the wavelength $\lambda_2$. The bundle of light having the wavelength $\lambda_1$ and emitted from the first luminous element 101a is substantially collimated by the convergent lens 102a. The collimated light is introduced into the first beam splitter 104a since the first prism 103a is not positioned in the light path, where the light is reflected to be directed toward the convergent lens 102b. Then, the light is collected by the convergent lens 102b to reach the optical fiber line 105a. On the other hand, the light having the wavelength $\lambda_1$ and sent from the optical fiber line 105b is substantially collimated by the convergent lens 102c. The collimated light is introduced into the first beam splitter 104a as it is, since the second prism 103b is not positioned in the light path, where the light is reflected to be directed to the convergent lens 102d. Subsequently, the light is collected by the convergent lens 102d to reach the first light receiving element 106a. On the other hand, the light having the wavelength $\lambda_2$ and sent from the optical fiber line 105a is collimated by the convergent lens 102b and then passes through the first beam splitter 104a to reach the convergent lens 102c. The light is then collected by the convergent lens 102c to reach the optical fiber line 105b, and then is transmitted therefrom.

The bundle of light having the wavelength $\lambda_2$ and emitted from the second luminous element 101b is collimated by the convergent lens 102e and then is reflected by the second beam splitter 104b to reach the convergent lens 102f, where the light is collected to be directed to the optical fiber line 105c. The light having the wavelength $\lambda_2$ and sent from the optical fiber line 105d is collimated by the convergent lens 102g and then is reflected by the second beam splitter 104b. The reflected light is collected by the convergent lens 102h and then is received by the second light receiving element 106b. The light having the wavelength $\lambda_1$ and sent from the optical fiber line 105c is collimated by the convergent lens 102f and then passes through the second beam splitter 104b. Then, the light is collected by the convergent lens 102g to reach the optical fiber line 105d, and then is transmitted therefrom.

In FIG. 13, the terminal stations 111a, 111b, 111c are connected to other stations through the construction shown in FIG. 15. Further, the first transmission/reception portion 117a of the repeat station 116a, and the second transmission/reception portion 92b of the repeat station 116b are the same as that shown in FIG. 10. That is to say, these portions can receive the light signal having the wavelength $\lambda_1$ and transmit the light signal having the wavelength $\lambda_2$. Further, the second transmission/reception portion 92a of the repeat station 116a, and the first transmission/reception portion 117b of the repeat station 116b are the same as that shown in FIG. 11. These portions can receive the light signal having the wavelength $\lambda_2$ and transmit the light signal having the wavelength $\lambda_1$.

Also in the fifth embodiment shown in FIG. 13, two loops, that is to say, a first loop shown by the solid arrows and a second loop shown by the broken arrows, are formed. The first loop is constituted by the first transmission portions 112a, 112b, 112c of the terminal stations 111a, 111b, 111c, first spectral beam splitters 113a, 113b, 113c, first reception portions 115a, 115b, 115c, optical fiber lines 114a, 114b, 114c, 118, and first transmission/reception portions 117a, 117b of the repeat stations 116a, 116b. This first loop is the same as the loop described in connection with the first embodiment, and thus, it is apparent that the signal can be transmitted along the looped path. The light signal having the wavelength $\lambda_1$ is successively transmitted between the stations in the rightward direction, and the light signal having the wavelength $\lambda_2$ is returned from the repeat station 116a to the repeat station 116b in the leftward direction. The second loop is constituted by the second transmission portions 119a, 119b, 119c of the terminal stations 111a, 111b, 111c, second spectral beam splitters 90a, 90b, 90c, second reception portions 94a, 94b, 94c, optical fiber lines 91a, 91b, 91c, 93, and second transmission/reception portions 92a and 92b of the repeat stations 116a, 116b. The light signal having the wavelength $\lambda_2$ is successively transmitted between the stations in the rightward direction, and the light signal having the wavelength $\lambda_1$ is returned from the repeat station 116a to the repeat station 116b in the leftward direction.

In the fifth embodiment, since there are two loops, even if one of the optical fiber lines, for example, the optical fiber line 114a is broken, the signal can be continued to transmit by using the loop shown by the broken arrows. Further, if two optical fiber lines connecting two stations, for example, the optical fiber lines 114a, 91b or the optical fiber lines 114c, 93 are both broken, a new one looped path can be formed by folding back the two loops in the following manner.

Figure 16:
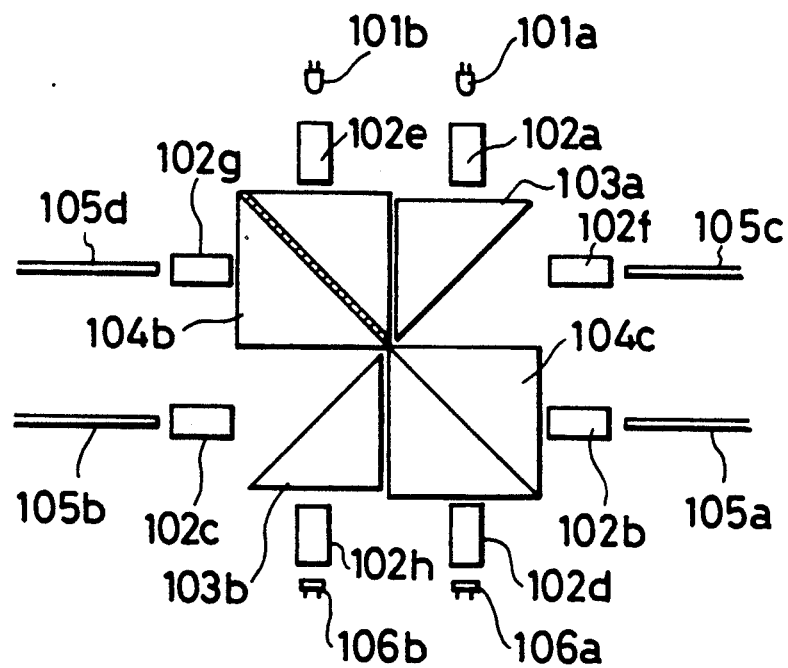

FIG. 16 schematically shows the transmission portions, reception portions and beam splitters when the accident occurs.

Different from FIG. 15, the first prism 103a and the second prism 103b are positioned in the respective light paths. The positioning of the first prism 103a or the second prism 103b in the light path as shown in FIG. 16 is effected only with respect to the terminal station where the signal is should be turned back; with respect to other terminal stations, the insertion of the first or second prism 103a or 103b into the light path are not effected, and thus, these prisms are positioned as shown in FIG. 15. When the first prism 103a is inserted into the light path, the advancing direction of the light having the wavelength $\lambda_1$ and emitted from the first luminous element 101a is changed. That is to say, the bundle of light substantially collimated by the convergent lens 102a is completely reflected by an oblique surface of the first prism 103a and then passes through the second beam splitter 104b to reach the convergent lens 102g, where the light is collected to be directed to the optical fiber line 105d, and then is transmitted therefrom. On the other hand, when the second prism 103b is inserted into light path, the advancing direction of the light having the wavelength $\lambda_2$ and sent from the optical fiber line 105a is changed. That is to say, the light emitted from the optical fiber line 105a is collimated by the convergent lens 102b and then passes through the first beam splitter 104c. Then, the collimated light is completely reflected by the second prism 103b. The reflected light is collected by the convergent lens 102h to reach the light receiving element 106b. In practice, the first and second prisms 103a, 103b are not simultaneously inserted into the respective light paths, but either of these prisms is inserted into the respective light path, in accordance with a position where the accident occurs.

In the fifth embodiment, since the signal is transmitted from the repeat station 116a to the repeat station 116b when the signal is returned to the left along the first and second loops, if the connection between two stations is interrupted, the repeat signal cannot be transmitted or received. However, the change in the light path due to the insertion of the prism as explained in connection with FIG. 16 enables the terminal station to handle the transmission and reception of the repeat signal (in place of the repeat station). For example, if both of the optical fiber lines 114a, 91b are broken, the second prism 103b corresponding to the terminal station 111b is inserted into the light path. Consequently, a looped path is formed by the stations between the terminal station 111b and the repeat station 116a. More particularly, first of all, the second transmission portion 119b of the terminal station 111b emits the light signal. This signal is successively transmitted to the right along the second loop in accordance with the broken arrows, and then is received by the second transmission/reception portion 92a of the repeat station 116a.

When the signal is returned from the repeat station 116a to the left, the first transmission/reception portion 117a emits the light signal having the wavelength $\lambda_2$ to the optical fiber line 114c. This light signal is transmitted to the left in accordance with the solid arrows, without being received by the intermediate terminal stations such as the terminal station 111c. As explained in connection with FIG. 16, the light signal is received by the second reception portion 94b of the terminal station 111b. On the basis of the received light signal, the second transmission portion 119b of the terminal station 111b emits a light signal. In this way, the looped path for transmitting the light signal is completed. The signal transmission to the right is performed by using the second loop, and the signal transmission to the left is performed by using the first loop.

On the other hand, for example, when both of the optical fiber lines 114c, 93 are broken, the signal transmission to the right is performed by using the first loop and the signal transmission to the left is performed by using the second loop, thus forming a loop between the repeat station 116b and the terminal station 111c. In this case, the first prism 103a corresponding to the terminal station 111c is inserted into the light path. In this way, the terminal station 111c can emit the light signal having the wavelength $\lambda_1$ from its first transmission portion 112c toward the optical fiber line 91c on the basis of the light signal received by its first reception portion 115c. This emitted light signal is received by the second transmission/reception portion 92b of the repeat station 116b. The repeat station 116b sends the received signal as it is (or modified to change the wave shape thereof or amplified) from its first transmission portion 117b to the optical fiber line 118. In this way, it is apparent that the looped path is formed.

As to the accident, while the breakage of the optical fiber line or lines was explained, when the transmission portion, reception portion, and/or transmission/reception portion is damaged, the new loop may be formed by sending back the signal in a terminal station adjacent to the terminal station having the damaged portion.

The present invention is not limited to the illustrated embodiments, but may include verious modifications or alternations without departure of the scope of the present invention.

What is claimed is:

1. A light signal transmission system comprising:
   first, second and third terminal stations each having a light transmitter and a light receiver;
   first and second light transmission paths each having one end connected to said first and second terminal stations, respectively, and each of said first and second light transmission paths comprising a single optical waveguide for transmitting a light signal bidirectionally; and
   connectors for connecting the other ends of said first and second light transmission paths to said third terminal station, said connectors being designed so that a light signal transmitted from said first terminal station through said first light transmission path is inputted to said third terminal station, a light signal emitted from said third terminal station is inputted to said second terminal station through said second light transmission path, and a light signal emitted from said second terminal station is inputted to said first terminal station through said first and second light transmission paths, without passing through said third terminal station.

2. A light signal transmission system according to claim 1, wherein said connectors comprise circulators.

3. A light signal transmission system according to claim 2, wherein said light transmitter and light receiver of each of said terminal stations are connected to a same light transmission path through a beam splitter.

4. A light signal transmission system according to claim 1, wherein said first and third terminal stations, and said second terminal station emit light signals, the light signals emitted by the first and third terminal stations having a different wavelength than the light signals emitted by the second terminal station, and said connectors each comprises a light dividing beam splitter having reflectance and transmittance variable in accordance with said wavelength.

5. A light signal transmission system according to claim 4, wherein said light receiver of said third terminal station is arranged to receive light sent from said first light transmission path and reflected by said light dividing beam splitter, and said light transmitter of said third terminal station is arranged in such a manner that light emitted from said light transmitter is reflected by said light dividing beam splitter and then is directed to said second light transmission path.

6. A light signal transmission system according to claim 4, wherein said light transmitter and light receiver of said first and second terminal stations are connected to the same light transmission path through a beam splitter.

7. A light signal transmission system comprising:
   first, second and third terminal stations each having two light transmitters and two light reception means;
   first and second light transmission paths each having one end connected to said first terminal station, respectively;
   third and fourth light transmission paths each having one end connected to said second terminal station, respectively; and
   connectors for connecting the other ends of said first, second, third and fourth light transmission paths to said third terminal station, respectively;
   said connectors being so designed that
   (a) a light signal transmitted from said first light transmitter of said first terminal station through said first light transmission path is inputted to said first light receiver of said third terminal station,
   (b) a light signal emitted from said first light transmitter of said third terminal station is inputted to said first light receiver of said second terminal station through said third light transmission path,
   (c) a light signal emitted from said first light transmitter of said second terminal station is inputted to said first light receiver of said first terminal station through said first and third light transmission paths, without passing through said third terminal station,
   (d) a light signal transmitted from said second light transmitter of said second terminal station through said fourth light transmission path is inputted to said second light receiver of said third terminal station,
   (e) a light signal emitted from said second light transmitter of said third terminal station is inputted to said second light receiver of said first terminal station through said second light transmission path, and
   (f) a light signal emitted from said second light transmitter of said first terminal station is inputted to said second light receiver of said second terminal station through said second and fourth light transmission paths, without passing through said third terminal station.

8. A light signal transmission system according to claim 7, wherein said connectors comprise a first circulator connecting the other ends of said first and third light transmission paths to said first light transmitter of said third terminal station, and a second circulator connecting the other ends of said second and fourth light transmission paths to said second light transmitter of said third terminal station.

9. A light signal transmission system according to claim 8, wherein said first light transmitter and said first light receiver of each of said terminal stations, and said second light transmitter and said second light receiver of each of said terminal stations are connected to the same light transmission paths.

10. A light signal transmission system according to claim 7, wherein said first light transmitter of said first terminal station, said second light transmitter of said second terminal station, and said first and second light transmitters of said third terminal station emit a light signal having a first wavelength, and said second light transmitter of said first terminal station and said first light transmitter of said second terminal station emit a light signal having a second wavelength different from said first wavelength, and wherein said connectors each comprises a light dividing beam splitter having reflectance and transmittance variable in accordance with said wavelength.

11. A light signal transmission system according to claim 10, wherein said first and second light receiver of said third terminal station are arranged to receive light beams sent from said first and fourth light transmission paths and reflected by said light dividing beam splitter, respectively, and said first and second light transmitters of said third terminal station are arranged in such a manner that light beams emitted from said light transmitter are reflected by said light dividing beam splitter and then are directed to said third and second light transmission paths, respectively.

12. A light signal transmission system according to claim 10, wherein said first light transmitter and said first light receiver of said first and second terminal stations, and said second light transmitter and said second light receiver of said first and second terminal stations are connected to the same light transmission paths.

13. A light signal transmission system according to claim 7, wherein said first and second light transmitters of said first terminal station and said first light transmitter of said third terminal station emit a light signal having a first wavelength, and said first and second light transmitters of said second terminal station and said second light transmitter of said third terminal station emit a light signal having a second wavelength different from said first wavelength, and wherein said connectors comprise a first light dividing beam splitter for substantially completely reflecting said light signal having said first wavelength and for substantially completely passing through said light signal having said second wavelength, and a second light dividing beam splitter for substantially completely reflecting said light signal having said second wavelength and for substantially completely passing through said light signal having said first wavelength.

14. A light signal transmission system according to claim 13, further including an input means for inputting a light signal emitted from said first light transmitter of said third terminal station to said second receiver of said second terminal station through said fourth light transmission path.

15. A light signal transmission system according to claim 14, wherein said input means comprises a prism insertable in a light path extending from said first light transmitter of said third terminal station to said first light dividing beam splitter.

16. A light signal transmission system according to claim 13, further including an input means for inputting a light signal transmitted from said second light transmitter of said first terminal station through said second light transmission path to said first receiver of said third terminal station.

17. A light signal transmission system according to claim 16, wherein said input means comprises a prism insertable in a light path extending from said second light dividing beam splitter to said fourth light transmission path.

18. A light signal transmission system according to claim 13, wherein said first light receiver of said third terminal station is arranged to receive light sent from said first light transmission path and reflected by said first light dividing beam splitter, and said first light transmitter of said third terminal station is arranged in such a manner that light emitted from said light transmitter is reflected by said first light dividing beam splitter and then is directed to said third light transmission path.

19. A light signal transmission system according to claim 13, wherein said second light receiver of said third terminal station is arranged to receive light sent from said fourth light transmission path and reflected by said second light dividing beam splitter, and said second light transmitter of said third terminal station is arranged in such a manner that light emitted from said light transmitter is reflected by said second light dividing beam splitter and then is directed to said second light transmission path.

20. A light signal transmission system according to claim 13, wherein said first light transmitter and said first light receiver of said first and second terminal stations, and said second light transmitter and said second light receiver of said first and second terminal stations are connected to the same light transmission paths.

21. A light signal transmission system according to claim 7,
wherein each of the first, second, third and fourth light transmission paths comprises a single optical waveguide for transmitting a light signal bidirectionally.

* * * * *

UNITED STATES PATENT AND TRADEMARK OFFICE
CERTIFICATE OF CORRECTION

PATENT NO. : 5,026,137
DATED : June 25, 1991
INVENTOR(S) : JUN TOKUMITSU

Page 1 of 2

It is certified that error appears in the above-identified patent and that said Letters Patent is hereby corrected as shown below:

AT [57] ABSTRACT

Line 8, "that" should read --so that--.
Line 16, "without" should read --without passing--.

COLUMN 1

Line 39, "or" should read --as--.

COLUMN 2

Line 34, "a" should be deleted.

COLUMN 4

Line 31, "station." should read --stations.--.

COLUMN 5

Line 22, "includes" should read --include--.

COLUMN 6

Line 1, "59a, 59b, 59c" should read --portions 59a, 59b, 59c--.
Line 12, "the accident" should read --accidents--.
Line 26, "56asends" should read --56a sends--.
Line 57, "31." should read --31a.--.

COLUMN 7

Line 45, "introduced the" should read --introduced into the--.

UNITED STATES PATENT AND TRADEMARK OFFICE
CERTIFICATE OF CORRECTION

PATENT NO. : 5,026,137
DATED : June 25, 1991
INVENTOR(S) : JUN TOKUMITSU

It is certified that error appears in the above-identified patent and that said Letters Patent is hereby corrected as shown below:

COLUMN 12

Line 13, "$\lambda_2.$" should read --$\lambda_2,$--.

COLUMN 13

Line 49, "is" should be deleted.
    Line 51, "are" should read --is--.

COLUMN 15

Line 5, "verious" should read --various--.
    Line 6, "of" (1st occurrence) should read --from--.
    Line 44, "comprises" should read --comprise--.

Signed and Sealed this

Twelfth Day of January, 1993

*Attest:*

DOUGLAS B. COMER

*Attesting Officer*      *Acting Commissioner of Patents and Trademarks*